No. 690,090.

A. M. AMOS.
COFFEE POT.
(Application filed May 24, 1901.)

Patented Dec. 31, 1901.

(No Model.)

Witnesses:
Edwin Popp.
Emma M. Graham.

Alexander M. Amos, Inventor
By Geyer & Popp
Attorneys.

UNITED STATES PATENT OFFICE.

ALEXANDER M. AMOS, OF BUFFALO, NEW YORK.

COFFEE-POT.

SPECIFICATION forming part of Letters Patent No. 690,090, dated December 31, 1901.

Application filed May 24, 1901. Serial No. 61,733. (No model.)

*To all whom it may concern:*

Be it known that I, ALEXANDER M. AMOS, a citizen of the United States, residing at Buffalo, in the county of Erie and State of New York, have invented a new and useful Improvement in Coffee-Pots, of which the following is a specification.

This invention relates to a coffee-pot in which the ground coffee and a suitable quantity of water are placed in a vessel arranged in the main vessel or pot and heated by steam generated in the main vessel. A coffee-pot of this kind is shown and described in Letters Patent of the United States No. 353,280, granted to me November 30, 1886.

The object of my present invention is to simplify and improve the construction of the coffee-pot with a view of reducing its cost, facilitating cleaning of the same, and rendering it more convenient and serviceable in use.

Figure 1:
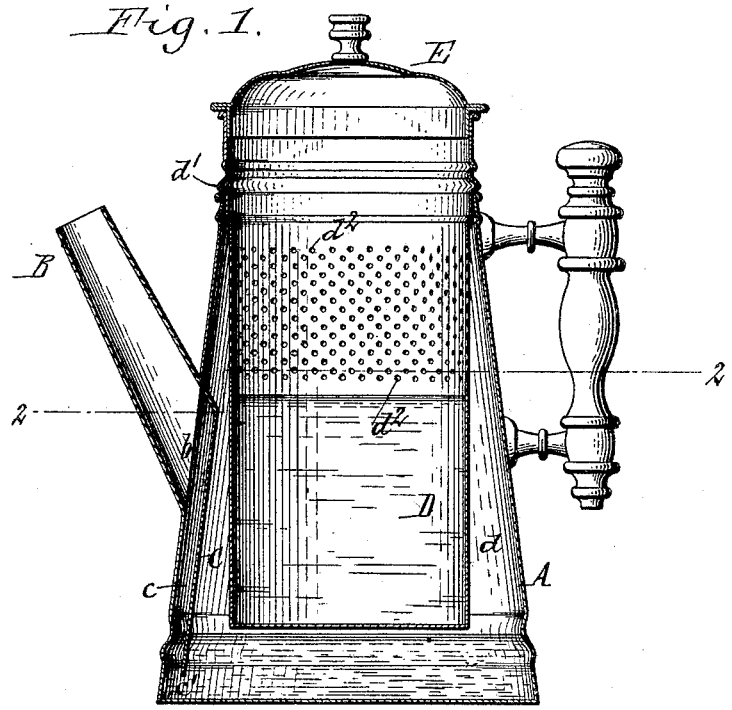
Figure 2:
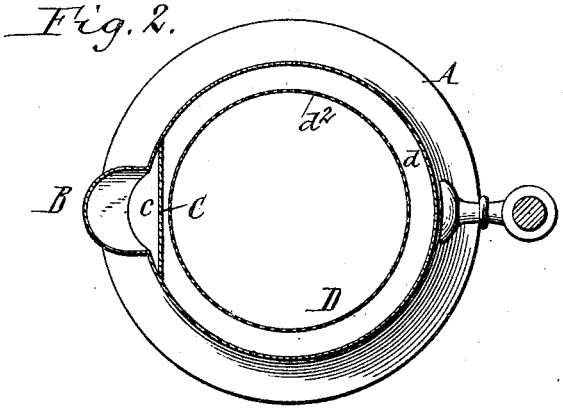

In the accompanying drawings, Figure 1 is a sectional elevation of my improved coffee-pot. Fig. 2 is a horizontal section thereof in line 2 2, Fig. 1.

Like letters of reference refer to like parts in both figures.

A is the body or main vessel of the coffee-pot, which may be cylindrical or of the conventional tapering form shown in the drawings. This main vessel is provided at the side opposite the usual handle with an ordinary spout B and is closed on all sides, except where the spout joins the same.

C is a shield or partition secured within the main vessel across the spout-opening $b$ and arranged at a short distance from the wall of the vessel to form an upright discharge-passage $c$, leading to the spout B. This partition extends downwardly from the top of the spout-opening $b$ nearly to the bottom of the vessel, so as to leave a passage $c'$ under the partition. As shown in Fig. 2, the lateral edges of the partition C bear against the wall of the pot, and, as shown in Fig. 1, the upper end of the partition is bent outwardly and bears against the wall of the pot at or near the upper edge of the spout-opening $b$, practically forming a tube closed at its upper end and sides and open at its lower end.

In the use of the coffee-pot the lower end of the partition C is submerged in the water placed in the main vessel of the pot, and this water thus forms a seal, which prevents the steam generated in the pot from escaping through the ascending passage $c$ and the spout B, thereby retaining the aroma of the coffee.

D is a heating or extracting chamber removably arranged in the main vessel A and adapted to contain the ground coffee and a quantity of water. This extracting-chamber, which is preferably cylindrical in form, extends nearly to the bottom of the pot and is somewhat smaller in diameter than the pot to leave a steam-space $d$ between the same and the pot. The upper portion of the extracting-chamber is fitted tightly in the open upper end of the pot A and provided with an annular bead or shoulder $d'$, which rests upon the upper end of the pot. The bottom of the extracting-chamber is solid or imperforate, and its side wall is likewise solid or imperforate from the bottom of the chamber up to about the middle thereof. The upper portion of its side wall, located within the main vessel A, is provided around its circumference with numerous perforations $d^2$, through which the steam generated in the main vessel A enters the extracting-chamber and through which the decoction of coffee flows from said chamber into the surrounding pot when the latter is tilted. The holes $d^2$ are made so small that they serve as a strainer for intercepting the dregs.

The open upper end of the extracting-chamber D may extend some distance above the pot A and is closed by a cover E.

In cooking coffee with my improved pot the extracting-chamber D is removed and a small quantity of water is placed in the pot or main vessel, thereby sealing the lower end of the discharge-passage $c$, as shown in Fig. 1. The ground coffee is next placed in the extracting-chamber, and the latter is filled with water, preferably boiling water, nearly to the lowermost row of its perforations $d^2$, after which the cover E is applied to the extracting-chamber and the latter placed in the pot A. Upon setting the coffee-pot on the stove the steam generated by the boiling of the water in the main vessel A rises through the space $d$ between said vessel and the extracting-chamber D and enters the latter through its perforations $d^2$, keeping the water therein at the boiling-point and extracting the full essence and aroma of the coffee. Before serving the coffee a further quantity of hot water is added to that already in the extracting-chamber, the water in the extracting-chamber overflowing through the perforations $d^2$ into the main chamber of the coffee-pot, whence it is discharged through the passage $c$ and the spout B. By tilting the pot sufficiently the entire liquid contents of the extracting-chamber and the main vessel A can be discharged. The strainer formed by the perforations $d^2$ permits the discharge of the liquid, but holds back the dregs, as hereinbefore described.

It will be observed that by my improved construction the water in the bottom of the main vessel is utilized not only to provide the steam for heating the water in the extracting-chamber, but the same is finally commingled with the liquid coffee in the extracting-chamber.

The extracting-chamber can be readily withdrawn from the coffee-pot, permitting the same and the pot to be conveniently and thoroughly cleaned.

I claim as my invention—

1. In a coffee-pot, the combination with a main or outer vessel provided with a discharge-spout and having its bottom and sides made imperforate except where said spout joins the same, of an inner vessel or extracting-chamber tightly and removably seated in the open upper end of said main vessel and having an imperforate bottom, the extracting-chamber being separated from the surrounding main vessel by an annular steam-space, and its side wall being imperforate from the bottom of the chamber to about its middle portion and provided above said solid portion and within the main vessel with perforations whereby the upper portion of the extracting-chamber communicates with said steam-space, substantially as set forth.

2. In a coffee-pot, the combination with a main or outer vessel provided with a discharge-spout and having its bottom and sides made imperforate except where said spout joins the same, of an inner vessel or extracting-chamber tightly and removably seated in the open upper end of said main vessel, separated therefrom by a steam-space and provided with an annular shoulder which rests upon the main vessel, the bottom of said extracting-chamber being imperforate and its side wall being imperforate from the bottom of the chamber to about its middle portion and provided between said imperforate portion and said shoulder with a band of perforations which open into said steam-space, substantially as set forth.

3. In a coffee-pot, the combination with a main or outer vessel provided with a discharge-spout and having its bottom and sides made imperforate except where said spout joins the same, of an inner vessel or extracting-chamber tightly and removably seated in the open upper end of said main vessel and having an imperforate bottom, the extracting-chamber being separated from the surrounding main vessel by an annular steam-space, and its side wall being imperforate from the bottom of the chamber to about its middle portion and provided above said solid portion and within the main vessel with perforations, and a discharge-tube arranged in the steam-space between said inner and outer vessels and extending from the inner end of said spout nearly to the bottom of the outer vessel, substantially as set forth.

Witness my hand this 21st day of May, 1901.

ALEXANDER M. AMOS.

Witnesses:
 THEO. L. POPP,
 CARL F. GEYER.